May 1, 1956  J. R. FERGUSON  2,744,209
HEADLIGHT UNIT FOR MOTOR VEHICLES
Filed July 14, 1952  4 Sheets-Sheet 1
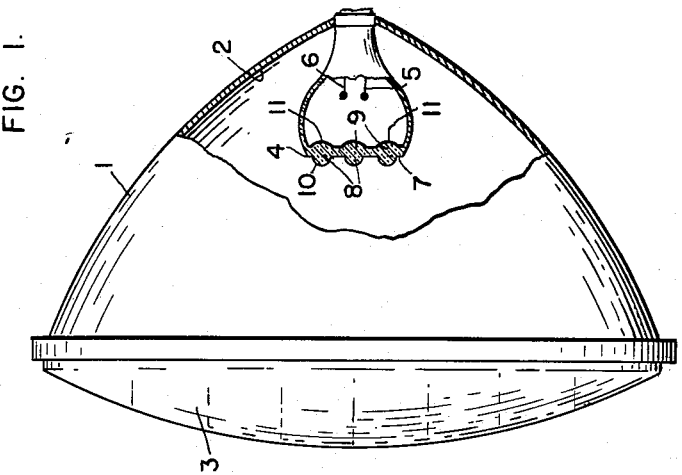
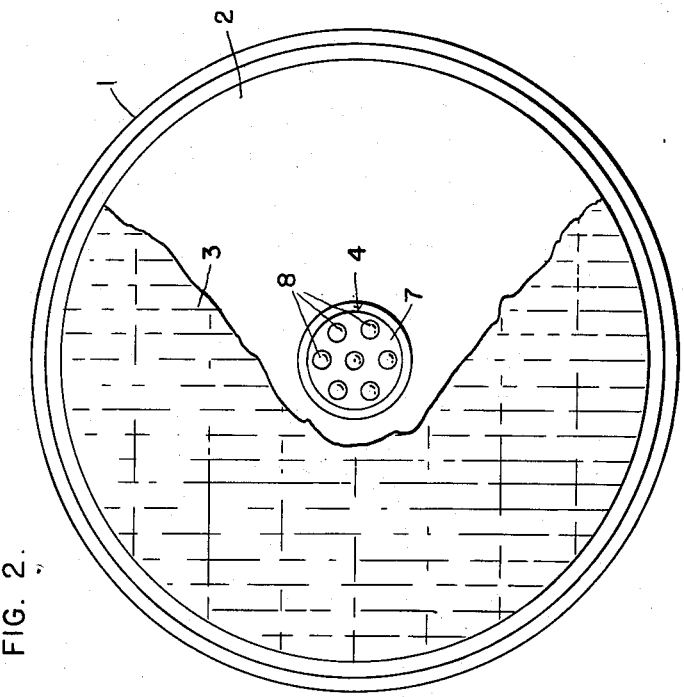
INVENTOR
JAMES R. FERGUSON
ATTORNEYS May 1, 1956  J. R. FERGUSON  2,744,209
HEADLIGHT UNIT FOR MOTOR VEHICLES
Filed July 14, 1952  4 Sheets-Sheet 2
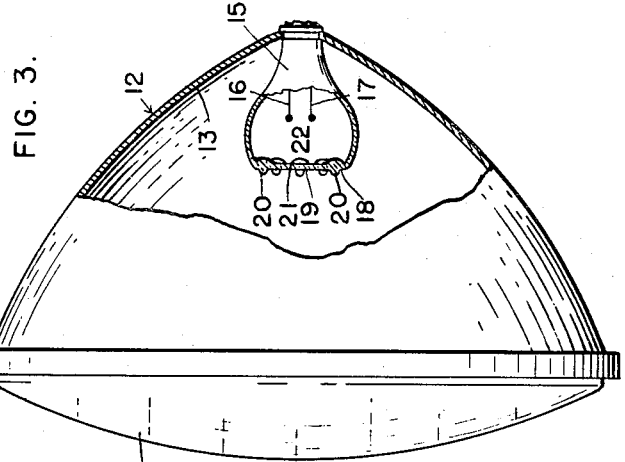
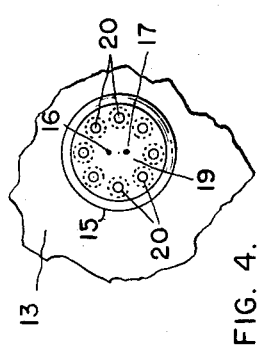
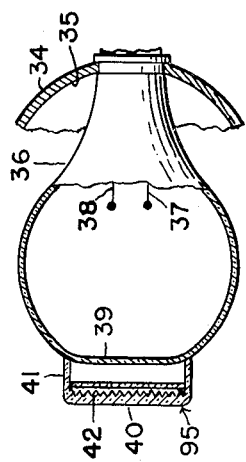
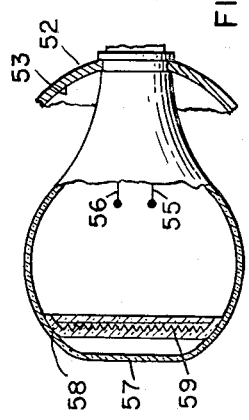
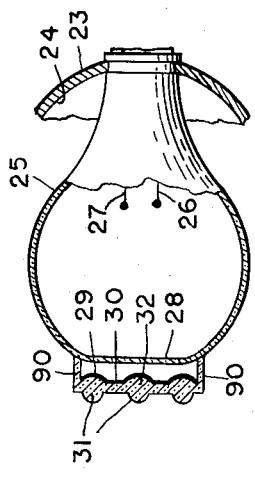
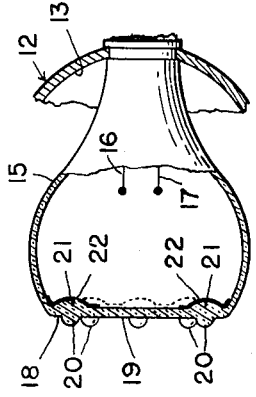
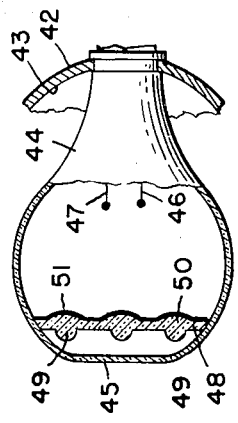
INVENTOR
JAMES R. FERGUSON
ATTORNEYS May 1, 1956   J. R. FERGUSON   2,744,209
HEADLIGHT UNIT FOR MOTOR VEHICLES
Filed July 14, 1952   4 Sheets-Sheet 3

INVENTOR
JAMES R. FERGUSON

ATTORNEYS

May 1, 1956   J. R. FERGUSON   2,744,209
HEADLIGHT UNIT FOR MOTOR VEHICLES
Filed July 14, 1952   4 Sheets-Sheet 4

INVENTOR
JAMES R. FERGUSON

BY *Mason, Mason & Sheridan*
ATTORNEYS

United States Patent Office 2,744,209
Patented May 1, 1956

2,744,209

HEADLIGHT UNIT FOR MOTOR VEHICLES

James R. Ferguson, Bristol, Tenn., assignor of one-half to Bristol Steel & Iron Works, Inc., Bristol, Va.-Tenn., a corporation of Virginia Application July 14, 1952, Serial No. 298,706

5 Claims. (Cl. 313—111)

This invention relates to a headlight unit for automotive vehicles of the general type illustrated in the Robert O. Ferguson Patents Numbers 2,512,623, issued June 27, 1950, and 2,565,763, issued August 25, 1951, and in copending applications of the inventor, and applications filed by me some of which have been filed concurrently herewith.

The principal object of the invention is to provide a headlight unit having a reflector for reflecting back the light beams of oncoming vehicles, which reflector is housed within the hermetically sealed space forming the interior of the sealed beam headlight unit.

Another object is to combine a reflector for oncoming headlight beams with a fog protector, and associate these parts with the light source means, either by making them an integral part of the light source means, or by mounting these elements with the hermetically sealed interior of the unit in close association with the light source means.

A further object is to locate a reflector of the type as set forth herein, in proper position with regard to the fog protector, the light source means and headlight lens, in order that none of these parts will interfere with the proper function of one or more of the other parts, yet each will operate at maximum efficiency.

Other objects will appear hereinafter throughout the specification.

In the drawings:

Fig. 1 is a side elevation of one form of the headlight unit with a part of the casing broken away.

Fig. 2 is a front elevation of the unit of Fig. 1 with a portion of the lens broken away;

Fig. 3 is a view similar to Fig. 1 of a second form of the invention;

Fig. 3a is an enlarged detail view of the bulb and support, partly in section, as shown in Fig. 3;

Fig. 4 is a front elevation of the bulb of Fig. 3 with the primary reflector broken away;

Figure 10:
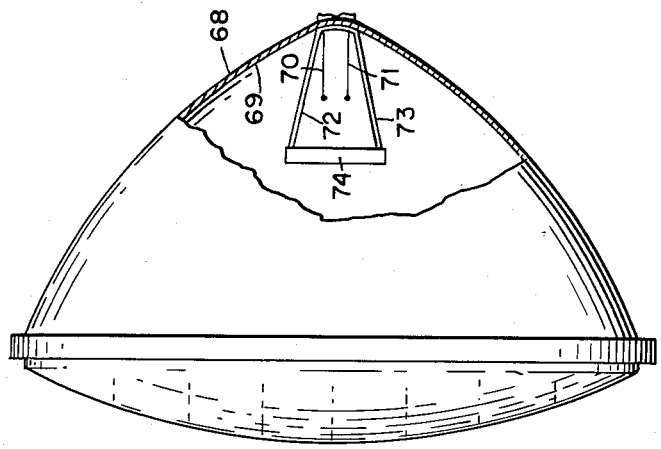
Figure 9:
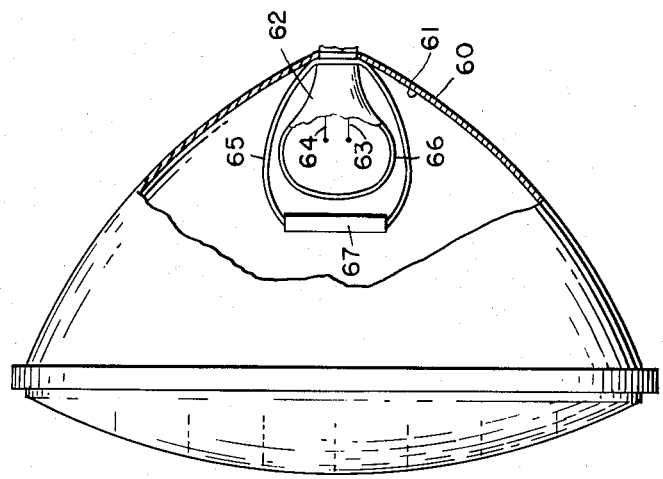
Figure 11:
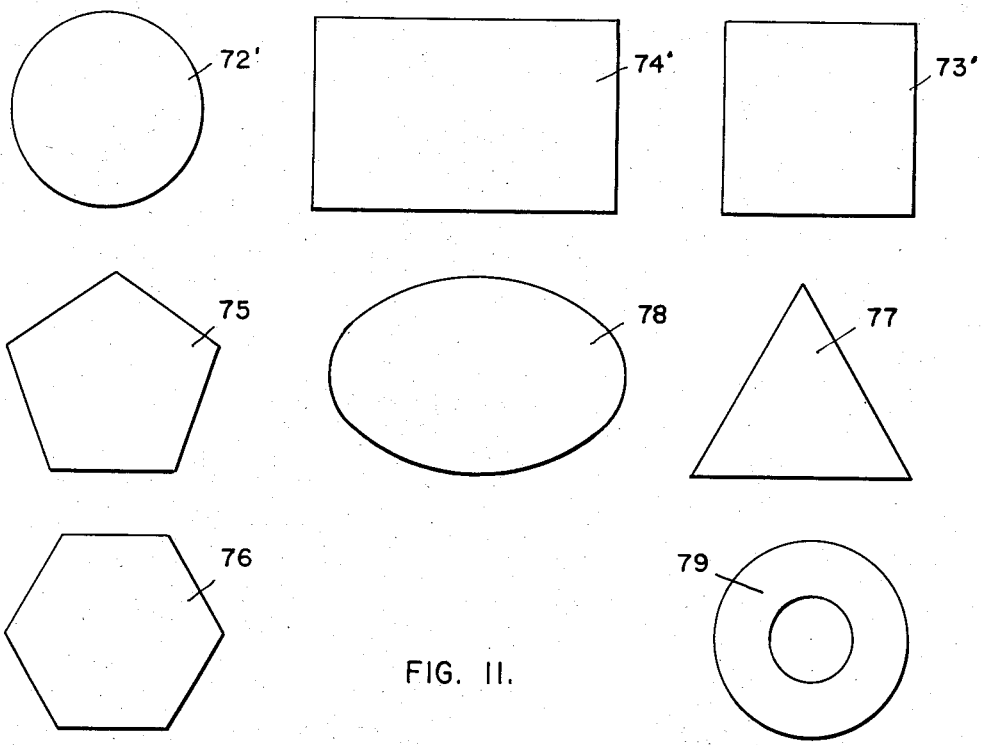
Figure 12:
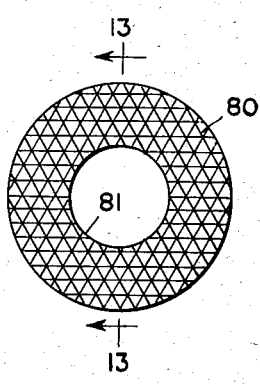
Figures 13, 15:
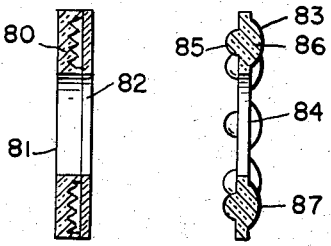
Figure 14:
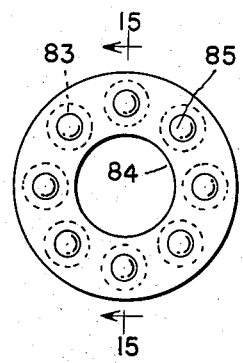

Figs. 5 to 8 inclusive show in section a part of the headlight casing and different forms of bulbs and secondary reflectors;

Fig. 9 is a view similar to Fig. 1 of a further modification of a bulb;

Fig. 10 is a view similar to Fig. 1 of a different modification of reflectors of different configurations;

Fig. 11 shows a front elevation of several types of secondary reflectors;

Fig. 12 is a front view of still another form of a secondary reflector;

Fig. 13 is a vertical section on the line 13—13 of Fig. 12;

Fig. 14 is a front view of a further form of a secondary reflector; and

Fig. 15 is a vertical section on the line 15—15 of Fig. 14.

In the drawings the numeral 1 is a sealed beam headlight unit, the outside appearance of which may be conventional or the lens portion of which may have windows or clear glass portions as set forth in my copending application Serial No. 298,705, filed concurrently herewith. The numeral 2 indicates the primary reflecting surface on the interior back portion of the unit, and 3 is the lens.

The light source means 4 preferably consists of a bulb as shown in which are mounted the usual high and low beam filaments 5 and 6, that extend through the casing in the usual manner.

The bulb front portion 7 is provided with a plurality of forwardly facing buttons or protrusions 8 and rearwardly facing buttons or protrusions 9 the radius curvature of the latter being preferably greater than the radius of curvature of the former. Each forwardly facing button is in substantially horizontal axial alignment with one of the rearwardly facing buttons.

Mounted permanently by spray coating, painting or other methods on the front portion of the bulb is a secondary reflector comprising a coating or surface 10 of reflecting material composed of chrome, nickel, aluminum or other reflecting materials or alloys thereof. It may also be composed of foil. This invention is not concerned with the particular material used as the secondary reflector 10 providing it has the necessary ability to withstand the heat and pressure necessary to the manufacture of the bulb and headlight casing.

The reflector preferably covers both the forwardly facing buttons and the surface of the front portion between the buttons. The bulb is made of glass, and during the manufacture of the bulb, there may be provided a glass layer, not shown, that forms an outside coating for the reflector.

The secondary reflector 10 because of its position with regard to the light sources, primary reflector 2 and lens 3 will function as a fog protector.

However, I may provide a separate fog protector 11 covering the rearwardly facing buttons and the remainder of the rear surface of the front portion, and the rear surface of this fog protector may be polished to form a third reflecting surface or it may be a non-reflective surface. This separate fog protector may be composed of any suitable material such as has been described above in connection with the reflector, but preferably it is composed of metallic material.

In the form shown in Figs. 3 and 3a the numeral 12 indicates the headlight as a whole, 13 the primary reflector, 14 the lens, and 15 the bulb having filaments 16 and 17.

The front portion 18 of the bulb is provided with a transparent or clear section 19 that is shown to be a circular flat disk with spaced raised buttons 20, as seen in Fig. 4, but it will be understood that said section could be of other suitable shape, such as square, oblong, oval or other configuration to suit requirements of manufacture or use. This clear section extends through the front portion of the bulb in order that the light source means may project its beams through the said clear section and the lens 14 to the road in front of the motor vehicle.

Any suitable number of forwardly and rearwardly projecting buttons 20 and 21 respectively, are provided.

The secondary reflector and fog protector 22 is in the general shape of an open ring of general doughnut shape with the center opening in horizontal axial line with clear section 19. The secondary reflector and fog protector may be composed of metal as has been described in connection with secondary reflector 10 of Fig. 1 and its rearwardly facing surface may be either a reflective or non-reflective surface as desired. The reflector may be located adjacent the rear on the back of the front portion 18 as shown, or on the front thereof within scope of the invention.

Four additional modifications of bulb in Figs. 5 to 8 have been shown. Each of these modifications of the invention forms a part of the sealed beam headlight unit, the lens and portions of the casing having been omitted for illustrative purposes.

In Fig. 5 the broken away casing is shown at 23, the primary reflecting surface at 24 and the bulb at 25 having filaments 26 and 27. The bulb has attached to the front portion 28 thereof preferably by fusing to the glass envelope a glass cap having a combined reflector and fog protector 29 the attaching portion 90 thereof being either circular or in the form of legs fused to the bulb 25. Forwardly facing and rearwardly facing buttons 31 and 32 respectively are provided on the attaching portion. The rearwardly facing buttons and portions of the rear face are provided with the secondary reflector and fog protector comprising the layer 30, whose forward face, or both faces of which may be suitably polished to provide reflecting surfaces. This layer is preferably composed of the same material as the secondary reflector 10 of Fig. 1. It will be understood that the inventor includes the mounting of the secondary reflector 30 on the forwardly facing buttons 31 in addition to or in substitution of the mounting of this reflector on the rearwardly facing buttons.

The structure shown in Fig. 6 includes a casing 34, primary reflecting surface 35, bulb 36, having filaments 37 and 38. The front portion 39 of the bulb has attached thereto a combined secondary reflector and fog protector cap 95 having an attaching portion 41 whereby the bulb and cap are fused together.

The cap has a reflector 42 of prismatic pyramidal design presenting a reflecting surface, as shown in Fig. 6 and described in my copending application filed of even date herewith. The cap is composed of plastic material such as of synthetic resinous materials or it may be made of glass. Either construction may be applied to the conventional bulb by fusing after or during manufacture.

The construction shown in Figs. 7 and 8 corresponds to those of Figs. 5 and 6, except that the caps are located within the bulb.

In Fig. 7, the casing 42 has a primary reflector 43, a bulb 44 having a front or forwardly facing portion 45, and filaments 46 and 47. Extending across the front portion of the bulb and within the bulb is a bridge portion 48 having forwardly facing and rearwardly facing buttons 49 and 50 respectively thereon. In the figure the rear face of the bridge has the reflector and fog protector 51. Only the forward face of the reflector and fog protector may have a reflecting surface, but alternately both sides of the secondary reflector and fog protector may have reflecting surfaces.

In Fig. 8 the casing 52 has a primary reflecting surface 53, a bulb 54 having filaments 55 and 56, a forwardly facing portion 57 and a bridge portion 58 having a prismatic such as multi-prismatic pyramidal reflecting inner portion 59 which also forms the fog protector.

Preferably both bulbs and their bridges as shown in Figs. 7 and 8 are of glass, although I do not desire to be limited to these materials.

As shown in Fig. 9, the casing 60 has a primary reflecting surface 61. A bulb 62 having filaments 63 and 64 is shown, although the bulb can be dispensed with, and exposed filaments be used instead. Extending on the sides of the filaments or bulbs and filaments when used, are supporting arms, two in number indicated at 65 and 66, although any suitable number of arms may be used alternately, a supporting cylinder, not shown, could be substituted for the arms.

Mounted on this supporting means is a reflector and fog protector 67, either the forward, or the forward and rearward surfaces of which are provided with reflecting surfaces. It will be understood that the reflector and fog protector may have flat forwardly and rearwardly facing surfaces as shown, or buttons, not shown, may be provided on either or both surfaces as has been described in connection with the structures shown by other figures herein. The reflector and fog protector may be made of glass or plastic materials composed of synthetic resins.

In Fig. 10 an additional form of the invention is shown wherein exposed or naked filaments are mounted within the hermetically sealed casing 68, having a primary reflector 69.

The casing supports the exposed filaments 70, and 71. Arms 72 and 73, support a secondary reflector and fog protector 74 of the same construction as shown at 67 in Fig. 9. Alternately in place of the arms 72 and 73 a supporting cylinder, not shown, may be used.

The secondary reflector and fog protector 74, as well as the secondary reflector and fog protector 67 of Fig. 9 may have a front face of anyone of a number of different shapes as shown in Fig. 11, the front elevational views showing the same to be of disk, oval, or disk with an aperture in the middle, and various poly-sided shapes, indicated by the numerals 72' to 74' and 75 to 79 inclusive.

Additionally the combined reflectors and fog protectors 67 of Fig. 9, and 74 of Fig. 10, may be in the form shown in Figs. 12 to 15, in which two other constructions are illustrated.

In Figs. 12 and 13 an open ring 80 forms the reflector and fog protector, the same being composed preferably of glass or plastic material. The reflector and fog protector has an opening 81 through which rays of light from the filament of the structures of Figs. 9 and 10 may project and a heat protective disk 82 mounted on the rear side thereof, the rear surface of which may be reflective or non-reflective. The interior of the device is provided with a plurality of small prismatic pyramidal projections or the corner cube reflex type of reflector that act as reflecting prisms when light rays are projected against the device by oncoming vehicles.

In Figs. 14 and 15 the reflector and fog protector 83 has an aperture 84, forwardly facing buttons 85 and rearwardly facing buttons 86. Preferably the rearwardly facing buttons have a reflecting layer 87 whose front face has a reflecting surface, or both surfaces of which may be reflecting surfaces. I have shown in several of the figures such as to 5, 6, 7, 14 and 15, a metal backing on the rear buttons and it will be understood that this may be a reflective coating such as made by aluminum paint, or a layer or coating of any reflecting material. Alternately, the forward facing buttons and the front face of the device may be provided with the reflecting layer of metal, of the type described above in connection with the construction of Fig. 1.

In order to facilitate an understanding of the invention, reference has been made to the several embodiments illustrated in the accompanying drawings, and specific language has been employed. It will nevertheless be understood that no limitation of the scope of the invention is thereby contemplated, and that various alterations and modifications may be made, such as would occur to one skilled in the art to which this invention relates.

I desire to be limited in the practice of this invention only to the extent set forth in the appended claims.

What is claimed is:

1. A headlight unit comprising a headlight casing with an inside forwardly facing primary reflecting surface, a source of light comprising filament means located within said casing, said casing having a sealed interior space, a lens forming the forwardly facing wall of said casing, a secondary forwardly facing reflector and fog protector means located between said source of light and said lens and within said sealed casing, said secondary reflector and fog protector means including a glass envelope surrounding said filament means, said envelope having a front portion and a layer of reflecting material on the back surface of said front portion forming part of said fog protector means, forwardly facing buttons on the front surface and backwardly facing buttons on the rear surface of said glass envelope front portion, said layer of reflecting material covering said rearwardly facing buttons.

2. A headlight unit comprising a headlight casing having an inside forwardly facing primary reflecting surface, a source of light located within said casing, said casing having a sealed interior space, a lens forming the forwardly facing wall of said casing, a secondary forwardly facing reflector and fog protector means located between said source of light and said lens and within said sealed casing, said secondary reflector and fog protector means including an envelope surrounding said source of light, said envelope having a front portion and a layer of reflecting material on the back surface of said front portion forming part of said fog protector means, forwardly facing buttons on the front surface and backwardly facing buttons on the rear surface of said envelope front portion, said layer of reflecting material covering said rearwardly facing buttons.

3. A headlight unit comprising a headlight casing having an inside forwardly facing primary reflecting surface, a source of light comprising filament means located within said casing, said casing having a sealed interior space, a lens forming the forwardly facing wall of said casing, a secondary forwardly facing reflector and fog protector means located between said source of light and said lens and within said sealed casing, said secondary reflector and fog protector means including a glass envelope surrounding said filament means, said envelope having a front portion and a layer of reflecting material on the back surface of said front portion forming part of said fog protector means, backwardly facing buttons on the rear surface of said glass envelope front portion, said layer of reflecting material covering said rearwardly facing buttons.

4. A headlight unit comprising a headlight casing having an inside forwardly facing primary reflecting surface, a source of light located within said casing, said casing having a sealed interior space, a lens forming the forwardly facing wall of said casing, a secondary forwardly facing reflector and fog protector means located between said source of light and said lens and within said sealed casing, said secondary reflector and fog protector means including a glass envelope surrounding said source of light, said envelope having a front portion, a layer of reflecting material on the back surface of said front portion forming part of said fog protector means, forwardly facing buttons on the front surface and backwardly facing buttons on the rear surface of said glass envelope front portion, said front portion of said envelope comprising a centrally located substantially flat transparent section, and said buttons being substantially symmetrically arranged adjacent the edge of said front portion and around said transparent section, said layer of reflecting material covering the rear face of said front portion except said transparent section.

5. A headlight unit as defined in claim 4, wherein said forwardly facing buttons are each in substantial alignment with one of said backwardly facing buttons, and said reflecting material comprises a metallic layer permanently mounted on said front portion of said envelope.

References Cited in the file of this patent

UNITED STATES PATENTS

| | | |
|---|---|---|
| 1,323,963 | Caughrean | Dec. 2, 1919 |
| 1,594,635 | Skogland | Aug. 3, 1926 |
| 1,621,360 | Falge | Mar. 15, 1927 |
| 1,693,672 | Schroeder | Dec. 4, 1928 |
| 1,981,577 | Adler | Nov. 20, 1934 |
| 2,221,629 | Birdseye | Nov. 12, 1940 |
| 2,260,473 | Minchillo | Oct. 28, 1941 |
| 2,315,549 | Singer | Apr. 6, 1943 |
| 2,398,971 | Singer | Apr. 23, 1946 |
| 2,594,753 | Falge | Apr. 29, 1952 |